United States Patent
Watanabe et al.

(10) Patent No.: US 9,982,467 B2
(45) Date of Patent: May 29, 2018

(54) PUSH-UP DEVICE

(71) Applicant: NIFCO INC., Yokosuka-shi (Kanagawa) (JP)

(72) Inventors: Yasuhiro Watanabe, Yokosuka (JP); Naohiro Shimajiri, Yokosuka (JP)

(73) Assignee: NIFCO, INC., Yokosuka-Shi (Kanagawa) (JP)

( * ) Notice: Subject to any disclaimer, the term of this patent is extended or adjusted under 35 U.S.C. 154(b) by 0 days. days.

(21) Appl. No.: 15/110,296

(22) PCT Filed: Jan. 9, 2015

(86) PCT No.: PCT/JP2015/050554
§ 371 (c)(1),
(2) Date: Jul. 7, 2016

(87) PCT Pub. No.: WO2015/105192
PCT Pub. Date: Jul. 16, 2015

(65) Prior Publication Data
US 2016/0326780 A1 Nov. 10, 2016

(30) Foreign Application Priority Data
Jan. 10, 2014 (JP) ................................ 2014-003482

(51) Int. Cl.
*B60K 15/05* (2006.01)
*E05B 83/34* (2014.01)
(Continued)

(52) U.S. Cl.
CPC ............. *E05B 83/34* (2013.01); *B60K 15/05* (2013.01); *E05C 5/04* (2013.01); *E05C 19/022* (2013.01);
(Continued)

(58) Field of Classification Search
CPC .......... E05B 83/34; E05C 19/022; E05C 5/04; B60K 15/05; B60K 2015/0561; B60K 2015/0515
See application file for complete search history.

(56) References Cited

U.S. PATENT DOCUMENTS

2012/0167472 A1    7/2012  Taniguchi et al.

FOREIGN PATENT DOCUMENTS

| DE | 1784817 A1 | 1/1972 |
|----|-----------|--------|
| GB | 2455769 A | 6/2009 |

(Continued)

OTHER PUBLICATIONS

Written Opinion of Application No. PCT/JP2015/050554 dated Mar. 31, 2015.
(Continued)

*Primary Examiner* — D Glenn Dayoan
*Assistant Examiner* — Melissa A Black
(74) *Attorney, Agent, or Firm* — Thomas | Horstemeyer, LLP

(57) ABSTRACT

A push-up device includes a case, a rod juts out from inside the case so as to adopt an advanced position, a rod biasing member biases the rod in a jutting out direction pushing the rod out from inside the case, a lock mechanism that includes a slide cam that moves together with the rod in the jutting out direction and a rotation cam that is relatively rotatable with respect to the slide cam about the axis of the rod, with the lock mechanism positioned between the case and the rod, and locking the rod in a retracted position in the case by the rotation cam engaging with the slide cam and rotating due to the rod being pressed in against biasing force of the rod biasing member, and a rotation cam biasing member that biases the rotation cam toward the jutting out direction.

8 Claims, 14 Drawing Sheets

(51) Int. Cl.
*E05C 5/04* (2006.01)
*E05C 19/02* (2006.01)
(52) U.S. Cl.
CPC ................ *B60K 2015/0515* (2013.01); *B60K 2015/0561* (2013.01)

(56) References Cited

FOREIGN PATENT DOCUMENTS

| | | |
|---|---|---|
| JP | 2011-005945 A | 1/2011 |
| JP | 2011-0256528 A | 12/2011 |
| KR | 10-2004-0004043 | 1/2004 |

OTHER PUBLICATIONS

Supplementary European Search Report for corresponding EP Application No. 15735302, dated Jul. 17, 2017.
Korean Office Action dated Aug. 16, 2017 for corresponding KR Application No. 10-2016-7018563.

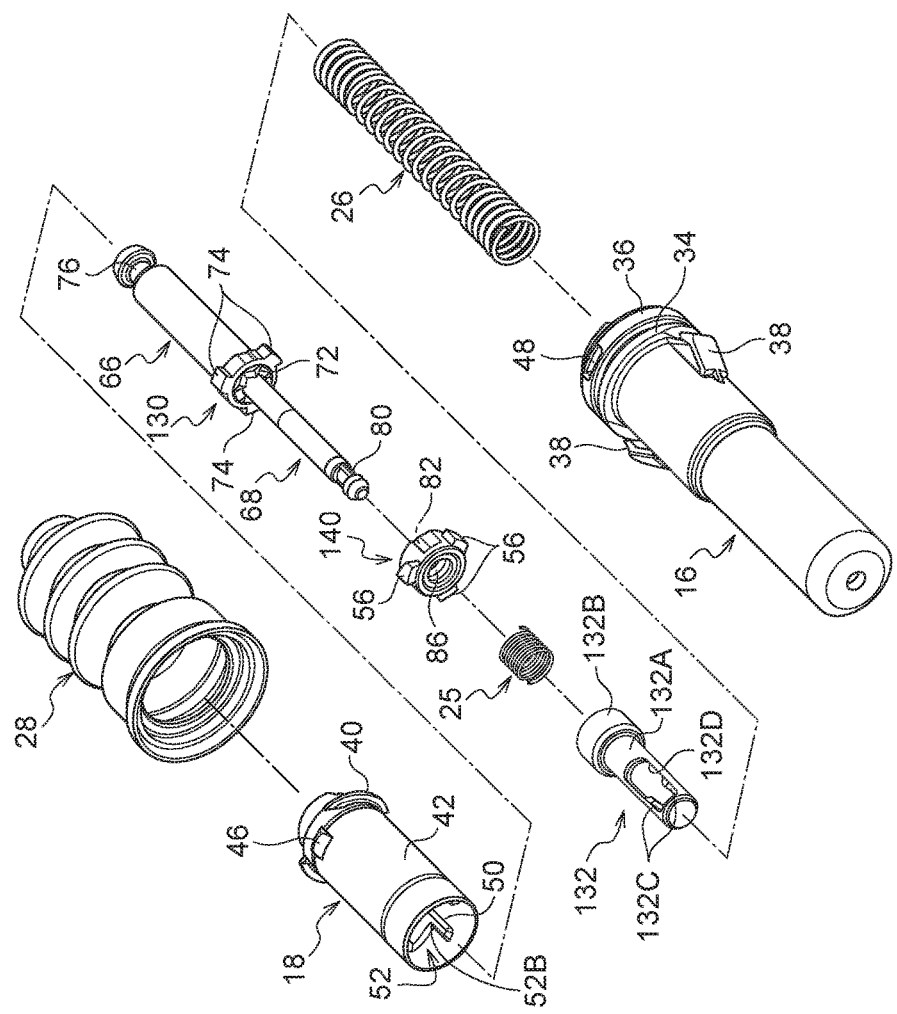

PUSH-UP DEVICE

CROSS-REFERENCE TO RELATED APPLICATIONS

This application is the National Stage of International Application No. PCT/JP2015/050554, filed 9 Jan. 2015, having the title "PUSH-UP DEVICE" which claims the benefit of and priority to Japanese Application No. 2014-003482, filed on 10 Jan. 2014, the contents of all of which are incorporated by reference as if fully set forth herein.

TECHNICAL FIELD

The present invention relates to a push-up device for pushing a member, such as a fuel lid, out in an opening direction, wherein the member is attached to a member of a vehicle body or the like, so as to be capable of opening or closing.

BACKGROUND ART

As a push-up device, a device is described in, for example, Japanese Patent Application Laid-Open (JP-A) No. 2011-5945. Such technology is provided with a cylindrical shaped case fixed to the vehicle body side so as to face the fuel lid, and a rod. The rod is retained in the case so as to be capable of sliding, and juts out from inside the case to push out the fuel lid. A lock means is also provided to place the rod in a locked state at a position retracted into the case by pressing the rod in against biasing force of a biasing member.

SUMMARY OF INVENTION

Technical Problem

However, in the device described in JP-A No. 2011-5945, play is built in in the axial direction of the rod in order to rotate a rotation cam about the rod axis when releasing the locked state. The result thereof is that there is play in the rod in the locked state.

In consideration of the above circumstances, the present invention is a push-up device capable of reducing play of a rod in a locked state.

Solution to Problem

A push-up device of a first aspect of the present invention includes: a tube shaped case that is fixed at a side of a second member that faces a first member; a rod that is retained inside the case so as to be capable of sliding, and that juts out from inside the case to adopt an advanced position pushing out the first member; a rod biasing member that is positioned between the case and the rod, and that is compressed under elastic deformation inside the case, so as to bias the rod in a jutting out direction pushing the rod out from inside the case; a lock mechanism including: a slide cam that moves together with the rod in the jutting out direction, and a rotation cam that is provided at a rear side of the slide cam in the jutting out direction and that is capable of relative rotation with respect to the slide cam about an axis of the rod, with the lock mechanism positioned between the case and the rod, and locking the rod in a retracted position in the case due to the rotation cam engaging with the slide cam and rotating due to the rod being pressed in against a biasing force of the rod biasing member; and a rotation cam biasing member that is provided inside the case and that biases the rotation cam toward the jutting out direction.

In the push-up device of the first aspect, the rod biasing member is positioned between the tube shaped case that is fixed at the side of the second member that faces the first member, and the rod that is retained inside the case so as to be capable of sliding, and that juts out from inside the case to adopt the advanced position pushing out the first member. The rod biasing member is compressed under elastic deformation inside the case, so as to bias the rod in a jutting out direction pushing the rod out from inside the case. When the rod is pressed in against the biasing force of the rod biasing member, the rotation cam engages with the slide cam and rotates, such that the rod adopts a locked state in the retracted position due to the lock mechanism positioned between the case and the rod. Moreover, the rotation cam is biased toward the jutting out direction of the rod by the rotation cam biasing member. As a result, play in the axial direction of the rod is reduced in the locked state due to the rotation cam being pressed against the slide cam by the rotation cam biasing member.

A push-up device of a second aspect of the present invention is the push-up device of the first aspect, wherein the lock mechanism further includes: a jutting out portion that is positioned partway along an axial direction of the rod and juts out in a radial direction toward an outer side; a lower-side rod section positioned at the rear side in the jutting out direction with the jutting out portion as a boundary, so as to be capable of sliding in the axial direction, the lower-side rod section supporting the slide cam, and supporting the rotation cam at the rear side of the slide cam in the jutting out direction such that the rotation cam is capable of rotating and capable of sliding in the axial direction, and the rotation cam meshing with the slide cam, and disengaging and being imparted with a rotation force in one direction by sliding of the rod; a slide groove that is positioned at one of an outer peripheral face of the slide cam or an inner peripheral face of the case, and that extends along a slide direction of the rod, a slide projection that is positioned at another of the outer peripheral face of the slide cam or the inner peripheral face of the case, and that prevents rotation of the slide cam with respect to the case due to relative sliding of the slide projection inside the slide groove due to sliding of the slide cam; an engagement projection that juts out from one of an outer peripheral face of the rotation cam or the inner peripheral face of the case; a lock groove that is positioned at another of the outer peripheral face of the rotation cam or the inner peripheral face of the case, that includes a lock portion into which the engagement projection fits, the engagement projection that has been fitted into the lock portion being disengageable from the lock portion by the rotation cam rotating due to the rotation cam disengaging from the slide cam; a first sleeve that is supported at a rear side of the rotation cam in the jutting out direction by the lower-side rod section so as to be capable of rotating and capable of sliding in the axial direction, and that is capable of abutting the rotation cam; and a second sleeve that is inserted at the lower-side rod section at a rear side of the first sleeve in the jutting out direction, and that limits movement of the rod in the slide direction, and wherein: the rotation cam biasing member comprises a first spring that is inserted at the lower-side rod section, that is elastically compressed between the first spring and the second sleeve, and that biases the first sleeve toward the jutting out direction, and the rod biasing member comprises a second spring that is inserted at the lower-side rod section, that is elastically compressed between the case inside and the second sleeve, and that biases the second sleeve toward the jutting out direction.

In the push-up device of the second aspect, the second spring that is inserted at the lower-side rod section that is elastically compressed between the case inside and the second sleeve, and, through the second sleeve, biases the rod toward the jutting out direction. The first spring having the lower-side rod section inserted therethrough is elastically compressed between the first sleeve and the second sleeve, and the rotation cam is pressed by the first spring, through the first sleeve, in the jutting out direction of the rod. In the locked state, the first spring is pressed and deflected by the second spring, and due to the first spring, the rotation cam, and the slide cam abutting, or being in the close vicinity, of each other, the biasing force of the second spring acts directly on the rod, reducing play in the axial direction of the rod. In the locked state, the biasing force of the second spring locks the rotation cam in a state pressed against the slide cam. However, during operation, since the rod is pressed in the opposite direction to the jutting out direction, a gap arises between the first sleeve and the second sleeve, and biasing force of the second spring ceases to act on the rotation cam and the slide cam. Therefore, due to being able to suppress the biasing force of the first spring to the minimum light load necessary to operate the rotation cam and the slide cam, the operational noise of the rotation cam and the slide cam can be reduced.

A push-up device of a third aspect of the present invention is the push-up device of the first aspect, wherein the lock mechanism further includes: a jutting out portion that is positioned partway along an axial direction of the rod and juts out in a radial direction toward an outer side; a lower-side rod section positioned at the rear side in the jutting out direction with the jutting out portion as a boundary, so as to be capable of sliding in the axial direction, the lower-side rod section supporting the slide cam, and supporting the rotation cam at the rear side of the slide cam in the jutting out direction such that the rotation cam is capable of rotating and capable of sliding in the axial direction, and the rotation cam meshing with the slide cam, and disengaging and being imparted with a rotation force in one direction by sliding of the rod; a slide groove that is positioned at one of an outer peripheral face of the slide cam or an inner peripheral face of the case, and that extends along a slide direction of the rod, a slide projection that is positioned at another of the outer peripheral face of the slide cam or the inner peripheral face of the case, and that prevents rotation of the slide cam with respect to the case due to relative sliding of the slide projection inside the slide groove due to sliding of the slide cam; an engagement projection that juts out from one of an outer peripheral face of the rotation cam or the inner peripheral face of the case; a lock groove that is positioned at another of the outer peripheral face of the rotation cam or the inner peripheral face of the case, that includes a lock portion into which the engagement projection fits, the engagement projection that has been fitted into the lock portion being disengageable from the lock portion by the rotation cam rotating due to the rotation cam disengaging from the slide cam; a sleeve that is supported at a rear side of the rotation cam in the jutting out direction by the lower-side rod section so as to be capable of rotating and capable of sliding in the axial direction, and that is capable of abutting the rotation cam; and a grommet that is disposed at a rear side of the sleeve in the jutting out direction, that is inserted at the lower-side rod section, and that limits movement of the rod in the slide direction, and wherein: the rotation cam biasing member comprises a first spring that is inserted at the lower-side rod section, that is elastically compressed between the sleeve and the grommet, and that biases the sleeve toward the jutting out direction, and the rod biasing member comprises a second spring that is inserted at the lower-side rod section, that is elastically compressed between the case inside and the sleeve, and that biases the sleeve toward the jutting out direction.

In the push-up device of the third aspect, the second spring that is inserted at the lower-side rod section that is elastically compressed between the case inside and the sleeve, and, through the sleeve, biases the rod toward the jutting out direction. The first spring that is inserted at the lower-side rod section that is elastically compressed between the sleeve and the grommet, the rotation cam is pressed by the first spring, through the sleeve, in the jutting out direction of the rod. Thus in the locked state, the rotation cam is pressed against the slide cam by the first spring, reducing play of the rod in the axial direction thereof.

A push-up device of a fourth aspect of the present invention is the push-up device of the first aspect, wherein the lock mechanism further includes: a lower-side rod section positioned at the rear side of the slide cam in the jutting out direction, the lower-side rod section supporting the rotation cam such that the rotation cam is capable of rotating and capable of sliding in the axial direction, and the rotation cam meshing with the slide cam, and that disengaging and being imparted with a rotation force in one direction by sliding of the rod; a slide groove that is positioned at one of an outer peripheral face of the slide cam or an inner peripheral face of the case, and that extends along a slide direction of the rod, a slide projection that is positioned at another of the outer peripheral face of the slide cam or the inner peripheral face of the case, and that prevents rotation of the rod with respect to the case due to relative sliding of the slide projection inside the slide groove due to sliding of the rod; an engagement projection that juts out from one of an outer peripheral face of the rotation cam or the inner peripheral face of the case; a lock groove that is positioned at another out of the outer peripheral face of the rotation cam or the inner peripheral face of the case, that includes a lock portion into which the engagement projection fits, the engagement projection that has been fitted into the lock portion being disengageable from the lock portion by the rotation cam rotating due to the rotation cam disengaging from the slide cam; and a sleeve that limits movement of the rod in the slide direction of the rod, the sleeve being inserted at the lower-side rod section, and wherein: the slide cam is formed partway along an axial direction of the rod and juts out in a radial direction toward an outer side, the rotation cam biasing member comprises a first spring that is inserted at the lower-side rod section, that is elastically compressed between the rotation cam and the sleeve, and that biases the rotation cam toward the jutting out direction, and the rod biasing member comprises a second spring that is inserted at the lower-side rod section, that is elastically compressed between the case inside and the sleeve, and that biases the sleeve toward the jutting out direction.

In the push-up device of the fourth aspect, the second spring that is inserted at the lower-side rod section that is elastically compressed between the case inside and the sleeve, and, through the sleeve, biases the rod toward the jutting out direction. The first spring that is inserted at the lower-side rod section that is elastically compressed between the rotation cam and the sleeve, and the rotation cam is pressed by the first spring in the jutting out direction of the rod. In the locked state, the first spring is pressed and deflected by the second spring, and due to the sleeve, the rotation cam, and the slide cam abutting, or being in the close vicinity, of each other, and the biasing force of the second spring acts directly on the rod, reducing play in the axial direction of the rod. In the locked state, the biasing force of the second spring locks the rotation cam in a state pressed against the slide cam. However, during operation, since the rod is pressed in the opposite direction to the jutting out direction, a gap arises between the rotation cam and the sleeve, and biasing force of the second spring ceases to act on the rotation cam and the slide cam. Therefore, due to being able to suppress the biasing force of the first spring to the minimum light load necessary to operate the rotation cam and the slide cam, the operational noise of the rotation cam and the slide cam can be reduced.

A push-up device of a fifth aspect of the present invention is the push-up device of any aspect of the first aspect to the fourth aspect, wherein the second member is a vehicle body, and the first member is a fuel lid attached to the vehicle body so as to be capable of rotating in opening and closing directions.

Due to including the push-up device of any aspect of the first aspect to the fourth aspect, the push-up device of the fifth aspect exhibits the above stated excellent operation and advantageous effects with a fuel lid attached to a vehicle body so as to be capable of rotating in opening and closing directions.

Advantageous Effects of Invention

Due to being configured as described above, the push-up device of the first aspect of the present invention is able to reduce play of the rod in the locked state.

Due to being configured as described above, the push-up device of the second aspect of the present invention is able to reduce play of the rod in the locked state, and also able to reduce operational noise of the rotation cam and the slide cam.

Due to being configured as described above, the push-up device of the third aspect of the present invention is able to reduce play of the rod in the locked state.

Due to being configured as described above, the push-up device of the fourth aspect of the present invention is able to reduce play of the rod in the locked state, and also able to reduce operational noise of the rotation cam and the slide cam.

Due to being configured as described above, the push-up device of the fifth aspect of the present invention is able to reduce play between the rod in the locked state and the fuel lid.

BRIEF DESCRIPTION OF DRAWINGS

FIG. 5 is an explanatory diagram corresponding to FIG. 4 and illustrating a state in which a rod has been pushed in.

FIG. 14 is an exploded perspective view illustrating a push-up device according to the third exemplary embodiment of the present invention.

DESCRIPTION OF EMBODIMENTS

First Exemplary Embodiment

Explanation follows regarding a first exemplary embodiment of a push-up device of the present invention, with reference to FIG. 1 to FIG. 8.

Figure 2:
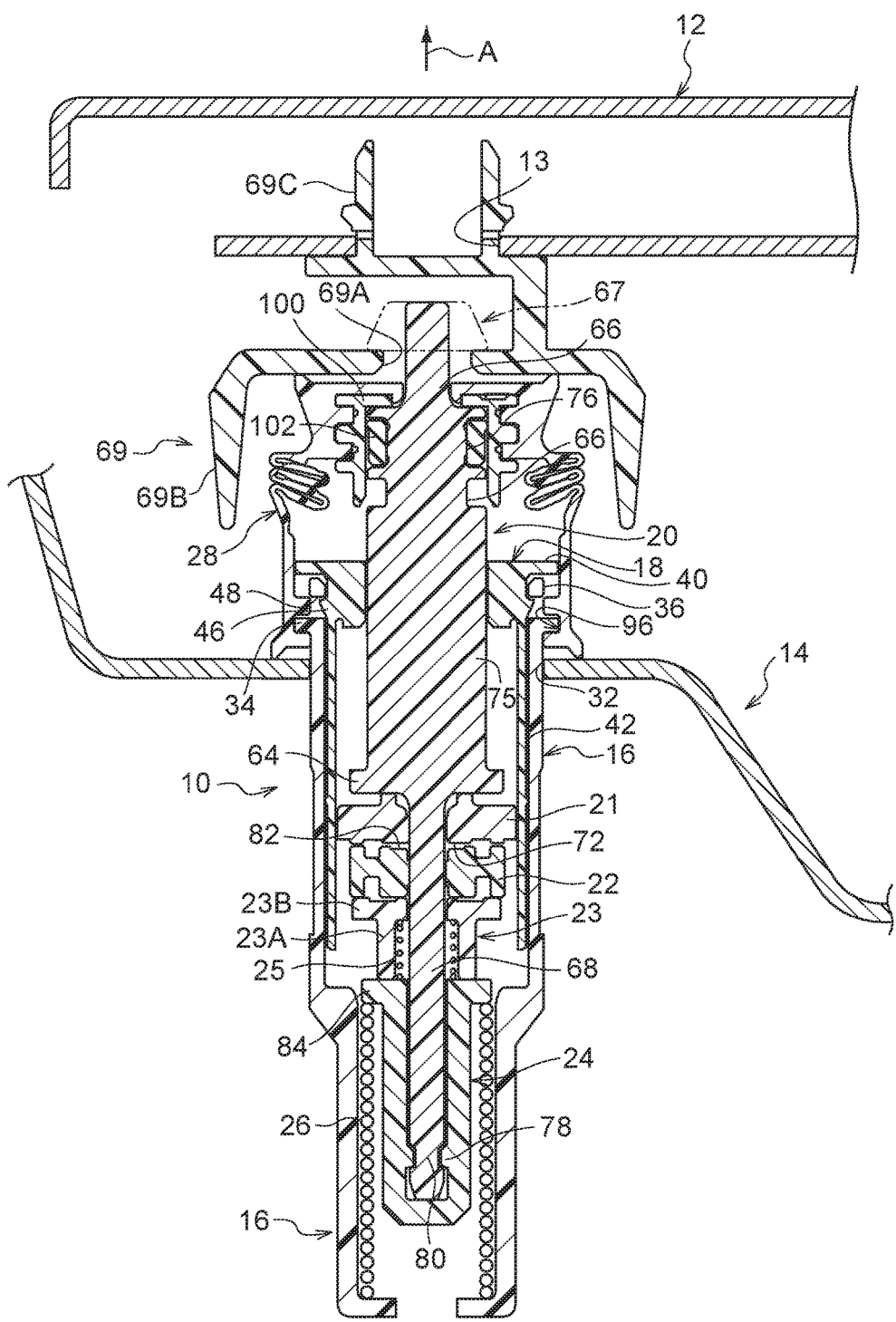
FIG. 2 is a cross-section taken from the side and illustrating a locked state of a push-up device according to the first exemplary embodiment of the present invention.

As illustrated in FIG. 2, a push-up device 10 of the present exemplary embodiment is provided, for example, on a vehicle body of a car, to a vehicle body inner panel 14, serving as a second member, facing a fuel lid 12, serving as a first member. The fuel lid 12 is attached to the inner panel 14 by a hinge, not illustrated in the drawings, so as to be capable of swinging in opening or closing directions, such that the fuel lid 12 is pushed out by the push-up device 10 in a jutting out direction (the arrow A direction in FIG. 2) that is the opening direction.

Figure 1:
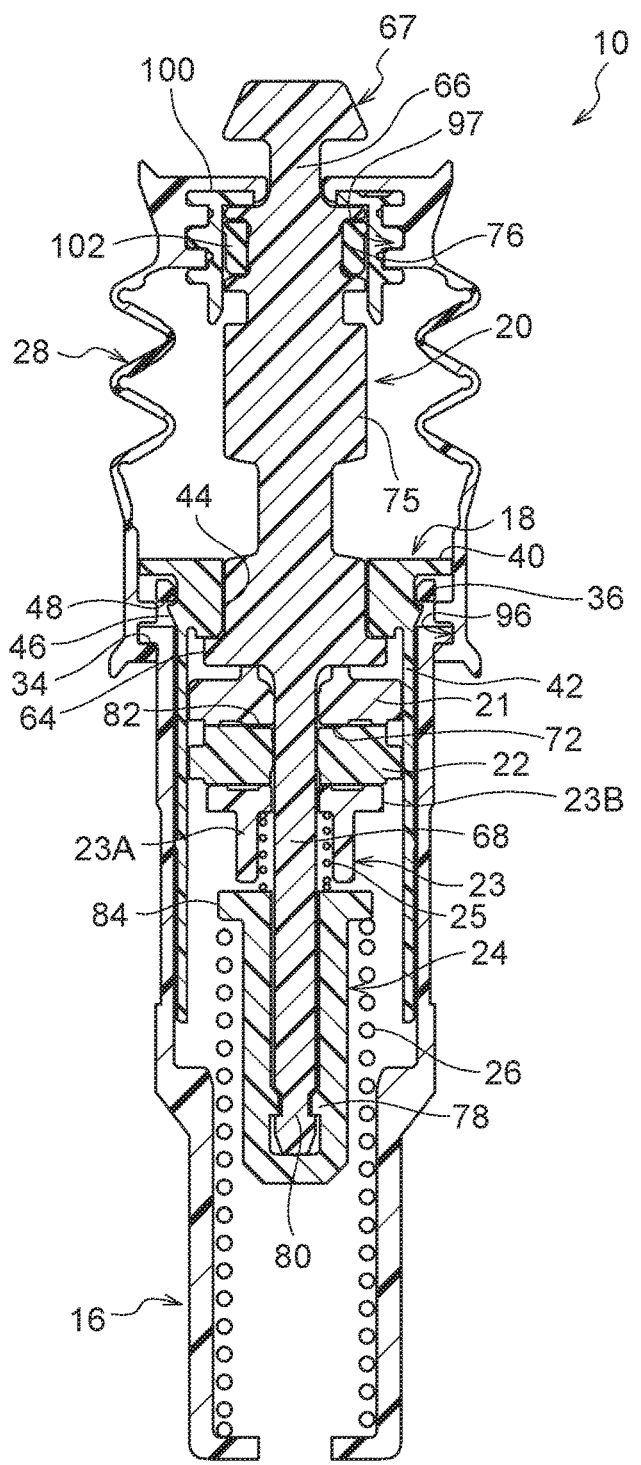
FIG. 1 is a cross-section taken from the side and illustrating a lock-released state of a push-up device according to a first exemplary embodiment of the present invention.

As illustrated in FIG. 1, the push-up device 10 includes a case 16, a rod 20, a jutting out portion 64 of the rod 20 serving as a lock mechanism, a cap 18, a slide cam 21, a rotation cam 22, a first sleeve 23, a second sleeve 24, a first spring 25 serving as a rotation cam biasing member, a second spring 26 serving as a rod biasing member, and a boot 28. Note that the parts of the push-up device 10 are not limited to the parts listed above. The first spring 25 and the second spring 26 are, as an example, configured by coiled springs, and the biasing force (load) of the first spring 25 is set smaller (lighter) than the biasing force (load) of the second spring 26.

Case

Figure 3:
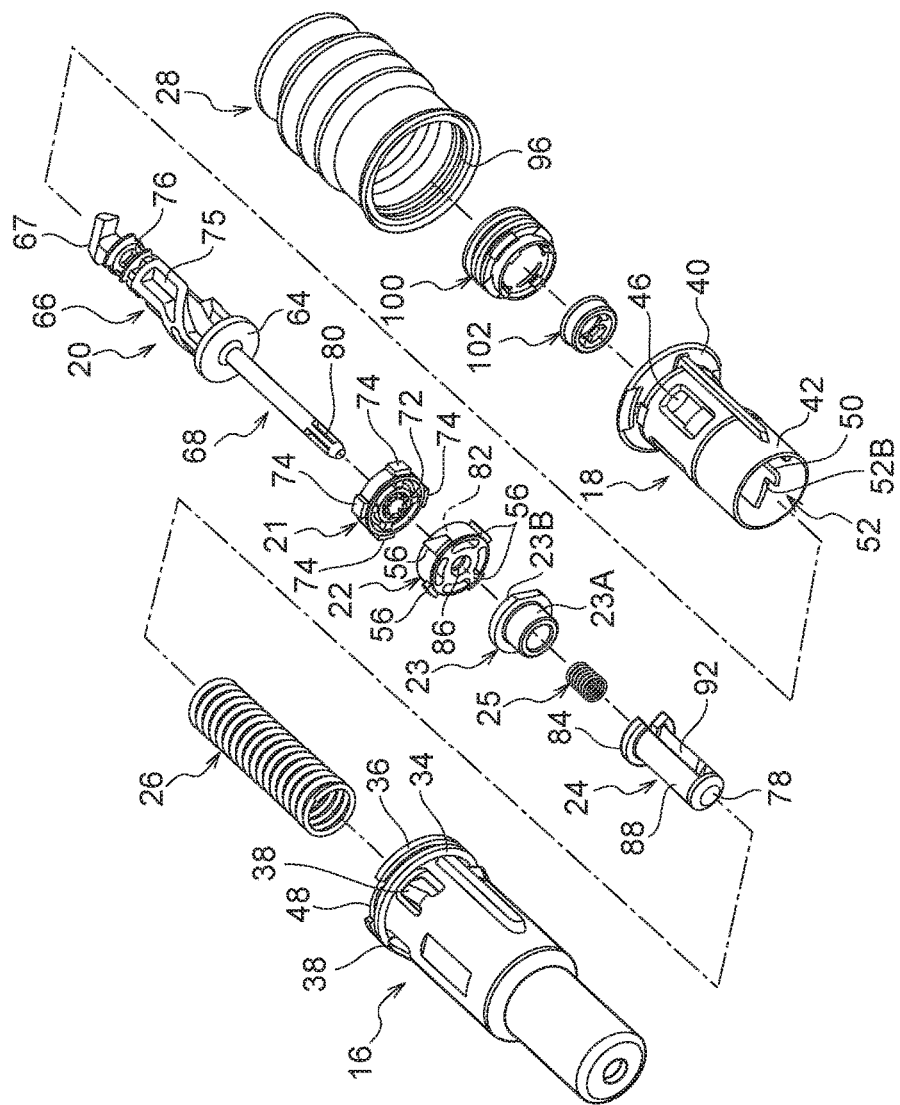
FIG. 3 is an exploded perspective view illustrating a push-up device according to the first exemplary embodiment of the present invention.

As illustrated in FIG. 3, the case 16 is formed in a tube shape. As illustrated in FIG. 2, an attachment hole 32 is formed in the inner panel 14 so as to pierce through the front and back faces thereof, and the case 16 is fixed to the attachment hole 32.

As illustrated in FIG. 3, the case 16 is formed in circular cylinder shape that is open at the upper face and formed with a bottom face. The external diameter of the case 16 is set so as to be the internal diameter of the attachment hole 32 in the inner panel 14, or less. A flange 34 is formed to an end portion on the open side of the case 16 so as to extend in radial directions toward the outer side, and a ring shaped attachment portion 36 is formed at the upper side of the flange 34. Plural elastically deformable elastic claws 38 are formed at the lower side of the flange 34, jutting out in a radial pattern from the outer periphery of the case 16. These elastic claws 38 are provided at a distance from the lower face of the flange 34 so as to maintain a separation thereto of the plate thickness of the inner panel 14.

As illustrated in FIG. 2, when the case 16 is aligned with the attachment hole 32 and fitted therein, the elastic claws 38 are temporarily pushed in, and then elastically recover at the back face side of the inner panel 14, so as to sandwich the inner panel 14 between themselves and the lower face of the flange 34. The case 16 is thereby fixed to the attachment hole 32.

Cap

As illustrated in FIG. 1, the cap 18 is attached to the open upper face of the case 16.

As illustrated in FIG. 3, the cap 18 includes a lid portion 40 that is slightly bigger than the open upper face of the case 16, and a circular tube portion 42 that is one step narrower than, and extends in circular tube shape from, the lower face of the lid portion 40.

Figure 7:
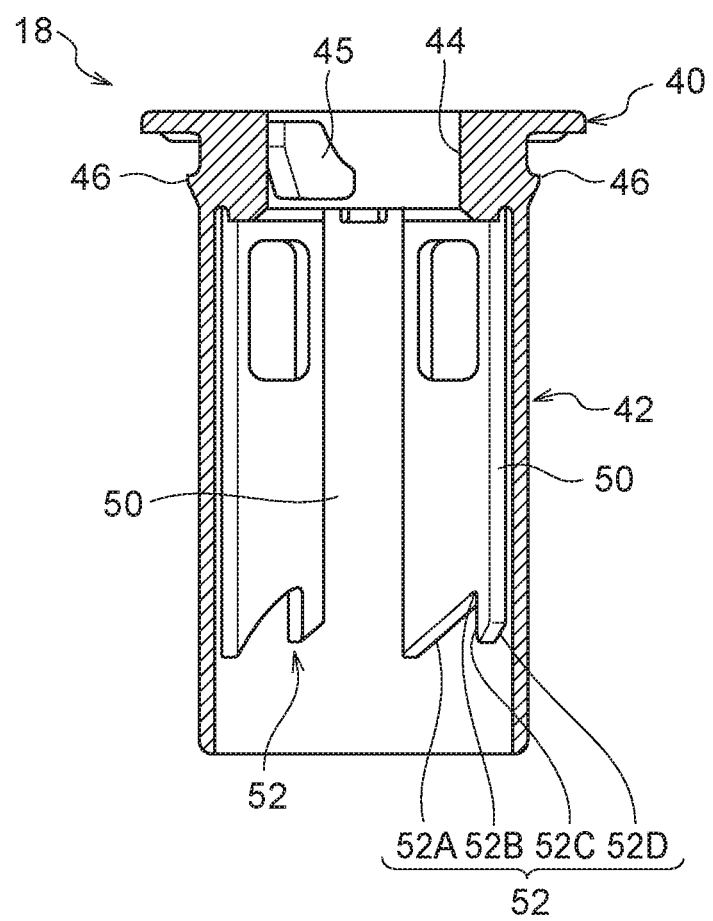
FIG. 7 is a cross-section taken from the side and illustrating a cap of a push-up device according to the first exemplary embodiment of the present invention.

As illustrated in FIG. 7, a circular shaped through hole 44 is formed piercing through an inner peripheral portion of the lid portion 40 of the cap 18, from top to bottom. The rod 20 is inserted into the through hole 44. Projections 45 are formed so as to jut out from inner peripheral portions of the through hole 44. The circular tube portion 42 of the cap 18 is set with an outer circumference having the internal diameter of the case 16 or smaller, and is inserted into the case 16. Plural elastically deformable anchor claws 46 are formed jutting out in a radial pattern on the outer periphery of the circular tube portion 42 of the cap 18, at locations adjacent to the lid portion 40.

As illustrated in FIG. 3, plural anchor holes 48 are formed in the attachment portion 36 of the case 16, piercing through from the inside to the outside, such that the anchor claws 46 of the cap 18 fit into the anchor holes 48 of the case 16.

Thus, by aligning the circular tube portion 42 of the cap 18 with the open upper face of the case 16 and fitting it therein, the anchor claws 46 are temporarily pushed in, and then the anchor claws 46 elastically fit into the anchor holes 48 so as to fix the cap 18 to the case 16.

As illustrated in FIG. 7, recessed slide grooves 50 are formed in an inner peripheral face of the circular tube portion 42 of the cap 18. The slide grooves 50 retain the slide cam 21 so as be capable of sliding. A plurality of the slide grooves 50 are formed with blind upper end portions, and open lower end portions. Lock mechanisms 52 are provided at the lower side of the slide grooves 50, as recesses formed in the inner peripheral face of the circular tube portion 42, such that the lock mechanisms 52 lock the rotation cam 22 so as to render it non-rotatable. The lock mechanisms 52 are formed in the spacing between adjacent of the slide grooves 50, and are formed as saw tooth shapes along the circumferential direction on the inner peripheral face of the circular tube portion 42.

Figure 4:
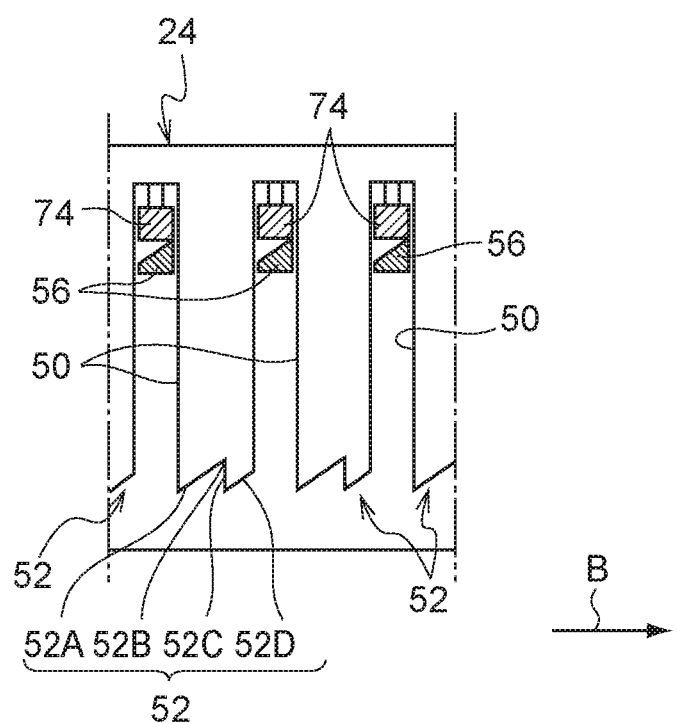
FIG. 4 is an explanatory diagram to explain operation of a lock mechanism of a push-up device.
Figure 5:
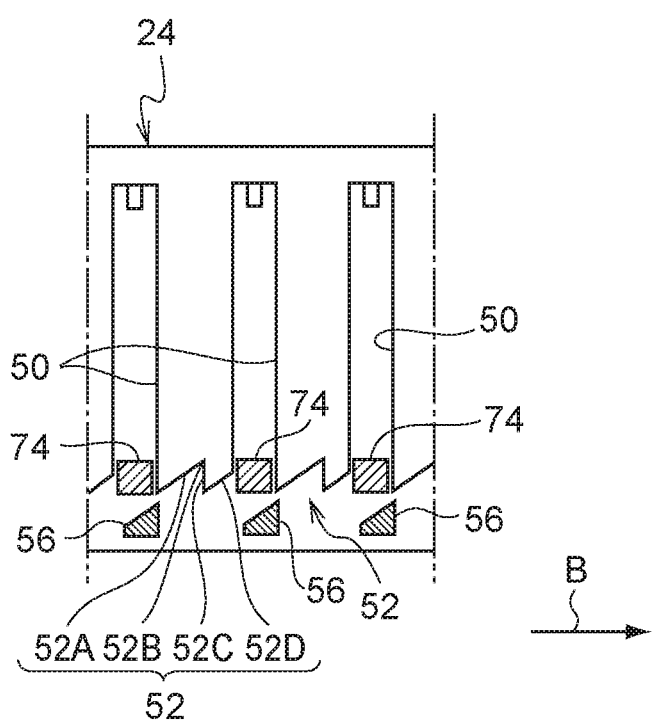
Figure 6:
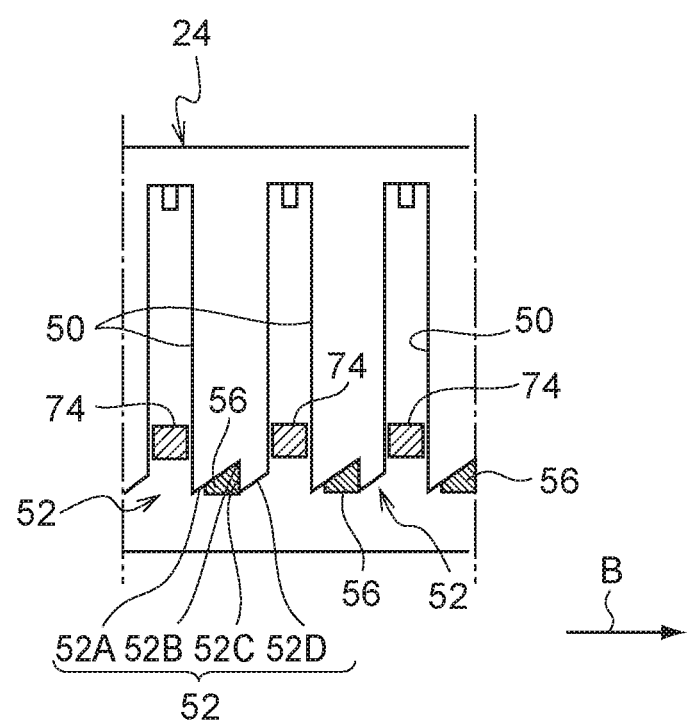
FIG. 6 is an explanatory diagram corresponding to FIG. 4 and illustrating a locked state of a lock mechanism.

As illustrated in FIG. 4 to FIG. 6, with reference to one of the slide grooves 50, the lock mechanisms 52 each include: a first sloping face portion 52A that slopes upwards (in the push-out direction of the rod) from the slide groove 50 on progression toward the front in a rotation direction of the rotation cam 22 (the direction of arrow B in FIG. 4 to FIG. 6); a lock portion 52B positioned at a slope upper end portion of the first sloping face portion 52A, namely, positioned in front thereof in the rotation direction of the rotation cam 22, with an engagement projection 56 of the rotation cam 22, described later, fitted therein; a vertically ascending vertical portion 52C descending downwards from the lock portion 52B; and an upward sloping second sloping face portion 52D sloping upwards from a lower end portion of the vertical portion 52C, with an slope upper end portion that faces another of the slide grooves 50 positioned in front in the rotation direction of the rotation cam 22.

A slope lower end portion of the first sloping face portion 54, namely at the rear thereof in the rotation direction of the rotation cam 22, faces the one slide groove 50. The slope angles are the same for the first sloping face portions 52A and the second sloping face portions 52D.

Rod

As illustrated in FIG. 1, the rod 20 is retained inside the case 16 so as to be capable of sliding, and juts out from inside the case 16 to adopt an advanced position, so as to push out the fuel lid 12, as illustrated in FIG. 2.

As illustrated in FIG. 3, the rod 20 is formed in a circular rod shape and includes: the circular plate shaped jutting out portion 64 that is positioned at an intermediate portion in the axial direction and juts outward in radial directions; an upper-side rod section 66 that is positioned at the upper side of the jutting out portion 64 and juts out from inside the case 16 so as to push out the fuel lid 12; and a lower-side rod section 68 that is positioned at the lower side of the jutting out portion 64 and is inserted through the second spring 26. The jutting out portion 64 of the rod 20 abuts a portion in the vicinity of the lower periphery of the through hole 44 in the lid portion 40 of the cap 18, such that movement of the rod 20 in the push-up direction is prevented.

The slide cam 21 having the lower-side rod section 68 inserted therethrough is disposed at the lower side of the jutting out portion 64, i.e. at a position to the rear thereof in the jutting out direction of the rod 20. Fixed-side cams 72 are formed on the lower face of the slide cam 21, and the fixed-side cams 72 mesh with movable-side cams 82 of the rotation cam 22, described later. The fixed-side cams 72 are formed continuously around the circumferential direction on the lower face of the slide cam 21, so as to form obtuse angled saw tooth shapes. Plural sliding projections 74 are formed at the outer periphery of the slide cam 21, jutting out in a radial pattern.

Due to the sliding projections 74 of the slide cam 21 fitting into the slide grooves 50 of the cap 18, and the sliding projections 74 ascending or descending along the slide grooves 50, the slide cam 21 is retained inside the cap 18 so as to be capable of sliding, but not capable of rotating.

As illustrated in FIG. 3, an engagement portion 67 is formed at an upper end of the rod 20, this being a leading end portion of the upper-side rod section 66. Guide grooves 75 are formed in a spiral shape at a length direction intermediate portion of the upper-side rod section 66 of the rod 20, such that the rod 20 rotates about its axial direction when the rod 20 advances or retracts due to sliding movement between the guide grooves 75 and the projections 45 of the cap 18.

As illustrated in FIG. 2, the engagement portion 67 of the rod 20 has a bar shape extending in a direction orthogonal to the axial direction of the rod 20. Thus, due to the rod 20 rotating about its axial direction when the rod 20 advances or retracts, the engagement portion 67 rotates about the axial direction, so as to be engaged, or disengaged, in an engagement hole 69A of a retainer 69 attached to the back face of the fuel lid 12. The engagement hole 69A is an elongated hole formed in an upper wall portion of a retainer body 69B.

Figure 8:
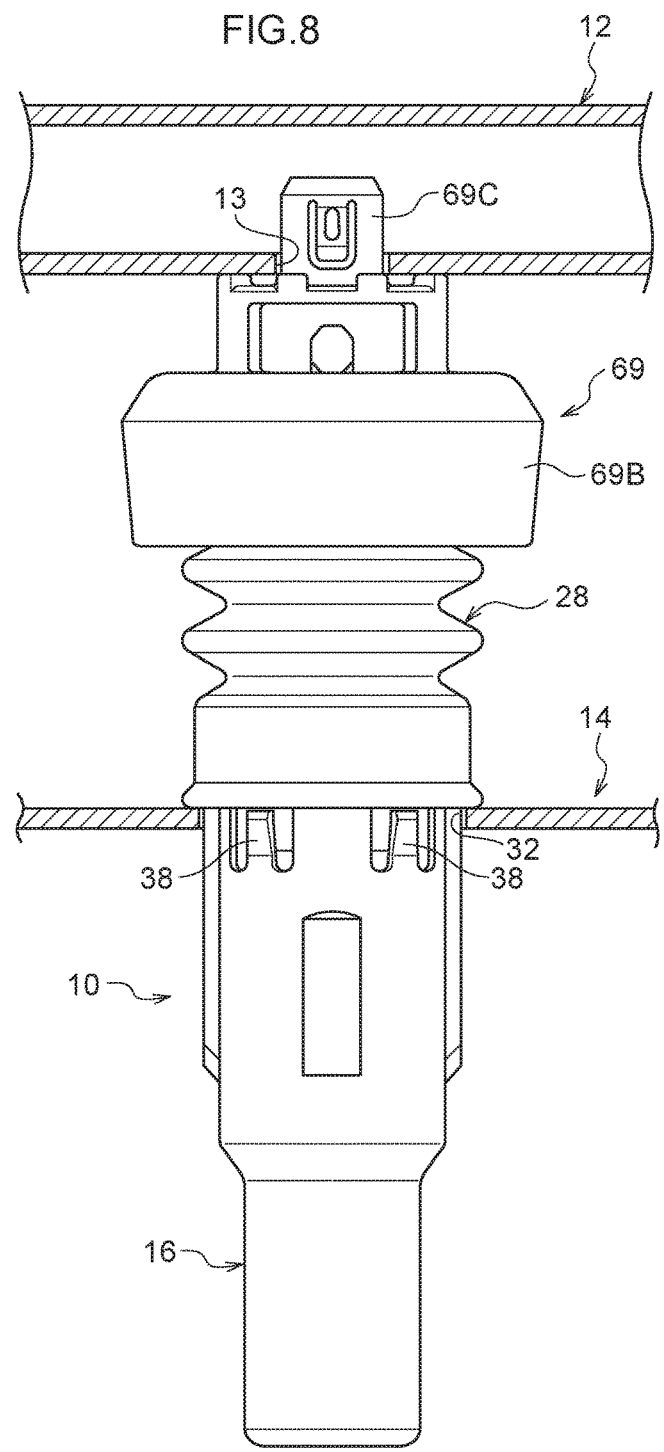
FIG. 8 is a cross-section taken from the side and illustrating an attached state, to a vehicle body, of a push-up device according to the first exemplary embodiment of the present invention.

As illustrated in FIG. 8, the retainer body 69B of the retainer 69 is configured with a cap shape, so as to cover an upper portion of the boot 28. An engagement portion 69C is provided so as to extend upward from an upper wall portion of the retainer body 69B, such that the retainer 69 can be attached to the fuel lid 12 by engaging the engagement portion 69C in an attachment hole 13 of the fuel lid 12.

Thus, as illustrated by the double-dotted dashed line in FIG. 2, when the rod 20 is in the locked state, the engagement portion 67 of the rod 20 is engaged with the engagement hole 69A of the retainer 69, so as to retain the fuel lid 12 in the closed state.

As illustrated in FIG. 3, a ring shaped annular groove 76 for attaching the boot 28 is formed in the vicinity of the upper end of the upper-side rod section 66 of the rod 20. A constricted portion 80 is formed at a lower end portion of the lower-side rod section 68 of the rod 20, narrowing so as to fit into a reduced diameter portion 78 of the second sleeve 24, described later.

The height of the constricted portion 80 of the rod 20 is set so as to be higher than the thickness in the up-down direction of the reduced diameter portion 78 of the second sleeve 24. This thereby achieves a configuration in which there is a clearance in the height direction of the constricted portion 80 in a state in which the constricted portion 80 is fitted into the reduced diameter portion 78. As a result, the reduced diameter portion 78 of the second sleeve 24 is able to ascend or descend up or down by the clearance amount to the constricted portion 80 of the rod 20. On the other hand, the rod 20 is able to ascend or descend up or down with respect to the second sleeve 24 by the clearance amount.

The amount of clearance is set according to the ascent or descent amount of the rotation cam 22 referred to above as it ascends or descends between a first height position in which the movable-side cams 82 of the rotation cam 22, described later, are meshed with the fixed-side cams 72 of the slide cam 21, and a second height position in which the movable-side cams 82 are disengaged from the fixed-side cams 72.

Sleeve

As illustrated in FIG. 3, the first sleeve 23 includes a sleeve main body 23A and a flange portion 23B. The second sleeve 24 includes a sleeve main body 88, a flange portion 84, the reduced diameter portion 78, and slits 92.

As illustrated in FIG. 1, the lower-side rod section 68 of the rod 20 is inserted into the first sleeve 23, and the first sleeve 23 is positioned between the rotation cam 22 and the first spring 25. The lower-side rod section 68 of the rod 20 is inserted into the second sleeve 24, and the second sleeve 24 is positioned between the first sleeve 23 and the second spring 26.

As illustrated in FIG. 1 and FIG. 3, the sleeve main body 23A of the first sleeve 23 and the sleeve main body 88 of the second sleeve 24 are formed in a tube shapes, and have the lower-side rod section 68 inserted therethrough. The flange portion 23B of the first sleeve 23 is positioned at an upper end portion of the sleeve main body 23A, abutting the rotation cam 22, and extending in radial directions both outwards and inwards. The flange portion 84 of the second sleeve 24 is positioned at an upper end portion of the sleeve main body 88, and extends in radial directions outwards.

As illustrated in FIG. 1, the reduced diameter portion 78 of the second sleeve 24 is positioned at a lower end portion of the sleeve main body 88, on the opposite side to the upper end portion thereof, and juts out in radial directions toward the inside in a ring shape. As illustrated in FIG. 3, a pair of the slits 92 are formed in the diameter direction of the sleeve main body 88 such that the slits 92 divide the upper end portion of the sleeve main body 88 into plural divisions. The slits 92 are formed from the end face at the upper side of the sleeve main body 88 downward to part of the way along the sleeve main body 88.

Rotation Cam Biasing Member

As illustrated in FIG. 1, the first spring 25 is positioned between the first sleeve 23 and the second sleeve 24, is compressed between the inside of the flange portion 23B of the first sleeve 23 and the upper end of the second sleeve 24, and biases the first sleeve 23 and the second sleeve 24 in the direction away from each other.

Rod Biasing Member

As illustrated in FIG. 1, the second spring 26 is positioned between the case 16 and the second sleeve 24, is compressed between the flange portion 84 of the second sleeve 24 and the bottom of the case 16, and, through the second sleeve 24, biases the rod 20 in the jutting out direction, pushing the rod 20 out from inside the case 16.

Lock Mechanism

As illustrated in FIG. 3, a lock mechanism is configured by a rotation cam type mechanism provided with the slide cam 21 and the rotation cam 22. The lock mechanism is positioned between the case 16 and the rod 20, so as to lock the rod 20 in a position retracted in the case 16 against the biasing force of the second spring 26. The rotation cam 22 is supported on the lower-side rod section 68 of the rod 20 so as to be capable of rotating and also capable of sliding in the axial direction. The rotation cam 22 includes the movable-side cams 82 that mesh with the fixed-side cams 72 of the slide cam 21, and that are disengaged and imparted with a rotation force in one direction by sliding of the rod 20.

The rotation cam 22 is formed in a donut shape, and includes: a central hole 86 that pierces through the center in the up-down direction and has the lower-side rod section 68 of the rod 20 inserted therethrough; and the movable-side cams 82 that are formed on the upper face of the rotation cam 22, that engage with the fixed-side cams 72 of the slide cam 21, and that are disengaged and imparted with biasing force in one direction by sliding of the rod 20. The movable-side cams 82 are formed in complementary shapes to the fixed-side cams 72 of the slide cam 21, and are formed continuously around the circumferential direction on the upper face of the rotation cam 22, so as to form obtuse angled saw tooth shapes. The plural engagement projections 56 are formed in a radial pattern around the outer periphery of the rotation cam 22.

As illustrated in FIG. 4 to FIG. 6, the engagement projections 56 of the rotation cam 22 are each formed as a trapezoid in plan view having an inclined face as the upper face, so as to fit into the lock portion 52B of the respective lock mechanism 52 of the cap 18. The inclined faces of the trapezoid shaped engagement projections 56 of the rotation cam 22 each have an angle of inclination that matches the angles of inclination of the first sloping face portion 52A and of the second sloping face portion 52D of the respective lock mechanism 52.

The left-right direction lateral width of the engagement projections 56 of the rotation cam 22 is set to the left-right direction groove width of the slide grooves 50 of the cap 18 or smaller, so as to be able to slide in the slide grooves 50.

Boot

As illustrated in FIG. 3, the boot 28 covers the upper-side rod section 66 that juts out from the case 16, is extendable and retractable, and is attached to the case 16. The boot 28 is formed in a hollow concertina shape, with open upper face and lower face. As illustrated in FIG. 1, a ring shaped recess 96 is formed in a ring shape jutting out in radial directions toward the inside on the inner peripheral face at the open lower face of the boot 28, and the flange 34 of the case 16 fits into the ring shaped recess 96. A ring shaped ribbed portion 97 is formed in ring shapes jutting out in radial directions toward the inside on the inner peripheral face at the open upper face of the boot 28. The ring shaped ribbed portion 97 of the boot 28 sandwiches a tube shaped collar 100 provided to the boot 28 and a tube shaped seal 102 provided on the rod side so as to fit into the annular groove 76 of the rod 20, such that the rod 20 rotates smoothly about its axial direction with respect to the boot 28 during advancing and retracting of the rod 20.

Operation and Advantageous Effects

Explanation follows regarding operation and advantageous effects of the push-up device 10 of the present exemplary embodiment.

As illustrated in FIG. 2, in an assembled state, the push-up device 10 is fixed to the inner panel 14 by the case 16 aligning with and fitting into the attachment hole 32 of the inner panel 14. In a closed state of the fuel lid 12, the push-up device 10 is locked while the rod 20 is in a contracted lock state.

When the fuel lid 12 in a closed state is pushed in, the rod 20 of the push-up device 10 is pressed into the case 16, and the locked state is released. As a result, the rod 20 is jutted out from inside the case 16 due to the recovery force from compression of the second spring 26, pushes the fuel lid 12 open, and releases engagement between the engagement portion 67 of the rod 20 and the engagement hole 69A of the retainer 69. This thereby enables the pushed open fuel lid 12 to be easily opened by hand.

To explain more specifically, in the contracted locked state of the rod 20, as illustrated in FIG. 6, the engagement projections 56 of the rotation cam 22 engage with the lock mechanisms 52 of the cap 18, and fit into the lock portions 52B. When, from this state, the rod 20 is then pressed into the case 16, the rotation cam 22 descends together with the slide cam 21, pressed by the jutting out portion 64 of the rod 20. Therefore, as illustrated in FIG. 5, the engagement projections 56 of the rotation cam 22 are disengaged from the lock portions 52B of the cap 18. When this occurs, meshing between the fixed-side cams 72 of the slide cam 21 and the movable-side cams 82 of the rotation cam 22 is disengaged, and the rotation cam 22 rotates in the arrow B direction. Then, when the force pressing in the rod 20 is released, the rotation cam 22 is pushed up by recovery force from the compressed second spring 26. When this occurs, the engagement projections 56 of the rotation cam 22 abut the second sloping face portions 52D of the cap 18. The engagement projections 56 accordingly ascend while make sliding contact with the second sloping face portions 52D, and, as illustrated in FIG. 4, fit from the sloping face upper end portions of the second sloping face portions 52D into the slide grooves 50.

As illustrated in FIG. 4, when the engagement projections 56 fit into the slide grooves 50, the engagement projections 56 are able to ascend along the slide grooves 50. The jutting out portion 64 of the rod 20 is accordingly pressed up, through the second sleeve 24, by recovery force from compression of the second spring 26, and the rod 20 extends so as to jut out from the case 16.

On the other hand, when the opened fuel lid 12 is closed by hand, the extended rod 20 of the push-up device 10 is pressed in toward the case 16 against the biasing force of the second spring 26, and the engagement projections 56 of the rotation cam 22 descend along the slide grooves 50.

Next, when the rod 20 is pressed in further toward the case 16 against the biasing force of the second spring 26, the engagement projections 56 of the rotation cam 22 descend along the slide grooves 50, the engagement projections 56 move out past the open lower end of the slide grooves 50, and the rotation cam 22 is then able to rotate. Thus, due to disengaging the meshing between the fixed-side cams 72 and the movable-side cams 82, the rotation cam 22 rotates in the direction of arrow B in FIG. 5, and moves from the lower side of the slide grooves 50 toward the first sloping face portions 52A of the lock mechanisms 52.

Next, when the force pressing in the rod 20 is released, the rotation cam 22 is pressed up by the recovery forces from compression of the first spring 25 and the second spring 26. When this occurs, the engagement projections 56 abut the first sloping face portions 52A. Thereby, as illustrated in FIG. 6, the engagement projections 56 ascend while making sliding contact with the first sloping face portions 52A, fit into the lock portions 52B, and return again to a locked state.

Thus, in the push-up device 10 of the present exemplary embodiment, the second spring 26 is elastically compressed between the inside of the case 16 and the second sleeve 24, and biases the rod 20, through the second sleeve 24, toward the jutting out direction. Moreover, the first spring 25 is elastically compressed between the first sleeve 23 and the second sleeve 24, and biases the first sleeve 23 and the second sleeve 24 in the direction away from each other. Thus, in the locked state illustrated in FIG. 2, the second sleeve 24 biased by the second spring 26 abuts the first sleeve 23, and the first sleeve 23 is locked in a state in which the first sleeve 23 presses the rotation cam 22 against the slide cam 21, reducing play in the axial direction of the rod 20.

In the present exemplary embodiment, the rod 20 rotates about its axial direction during advancing or retracting of the rod 20 due to the guide grooves 75 provided to the rod 20 and the projections 45 provided to the cap 18. In the locked state, the engagement portion 67 provided at the leading end portion of the rod 20 engages with the engagement hole 69A of the retainer 69 attached to the back face of the fuel lid 12, as illustrated by the double-dotted dashed line in FIG. 2. This thereby enables play between the rod 20 and the fuel lid fuel lid 12 to be reduced in the locked state.

Moreover, in the present exemplary embodiment, whereas there is a gap between the first sleeve 23 and the second sleeve 24 in the unlocked state of the rod 20 illustrated in FIG. 1, there is no gap between the first sleeve 23 and the second sleeve 24 in the locked state of the rod 20 illustrated in FIG. 2. Moreover, in the locked state, the second spring 26 is locked in a state in which the rotation cam 22 is pressed against the slide cam 21; however, due to the rod 20 being pressed during operation in the opposite direction to the jutting out direction (the opposite direction to the arrow A direction in FIG. 2), a gap arises between the first sleeve 23 and the second sleeve second sleeve 24 as illustrated in FIG. 1, and biasing force of the second spring 26 ceases to act on the rotation cam 22 and the slide cam 21. Therefore, due to being able to suppress the biasing force of the first spring 25 to the minimum light load necessary to operate the rotation cam 22 and the slide cam 21, the operational noise of the rotation cam 22 and the slide cam 21 can be reduced.

Second Exemplary Embodiment

Figure 9:
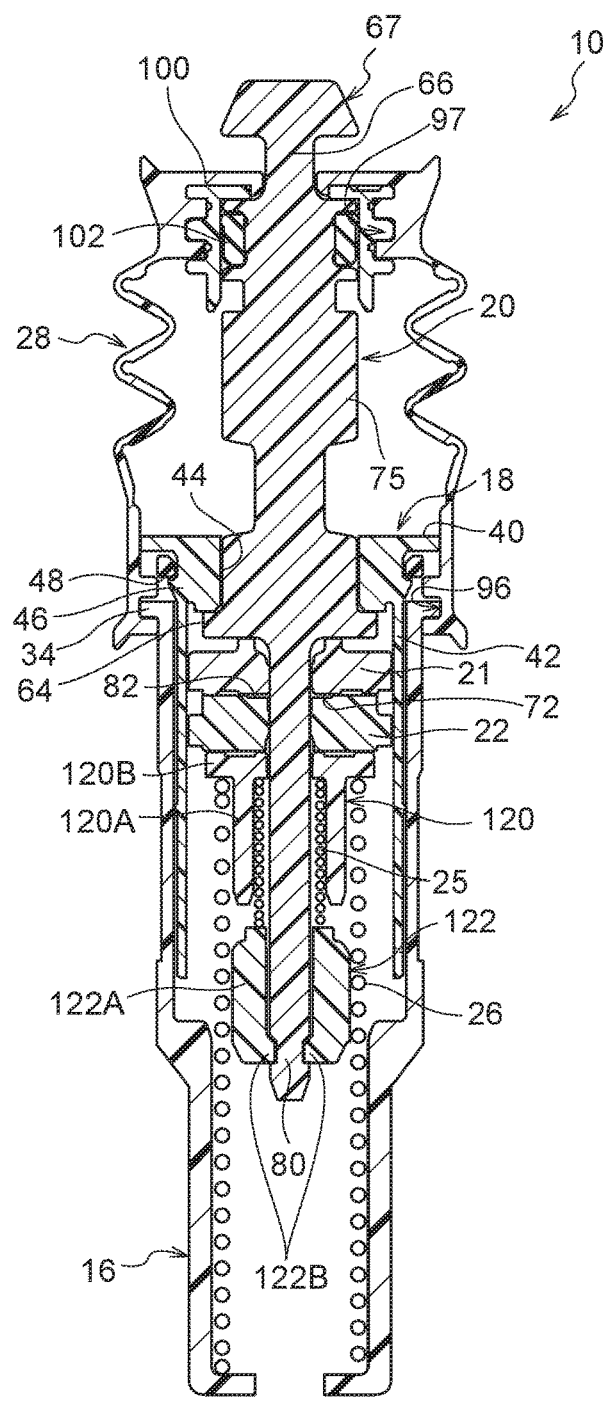
FIG. 9 is a cross-section taken from the side and illustrating a lock-released state of a push-up device according to a second exemplary embodiment of the present invention.
Figure 10:
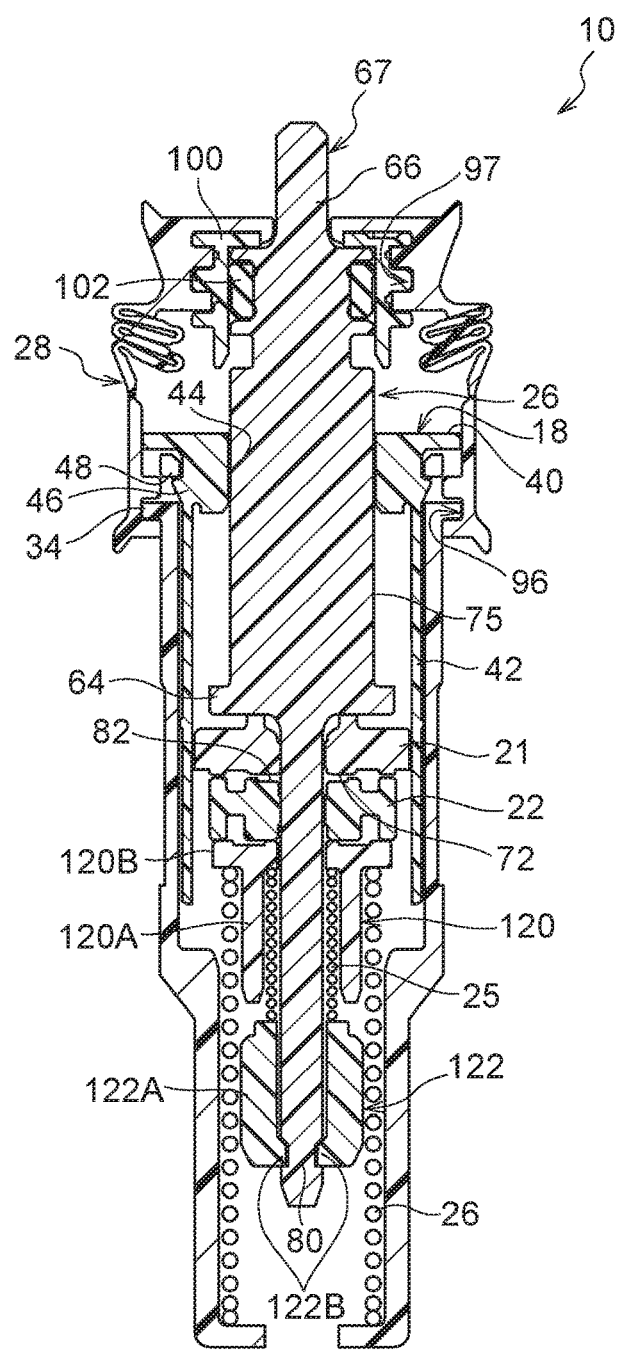
FIG. 10 is a cross-section taken from the side and illustrating a locked state of a push-up device according to the second exemplary embodiment of the present invention.
Figure 11:
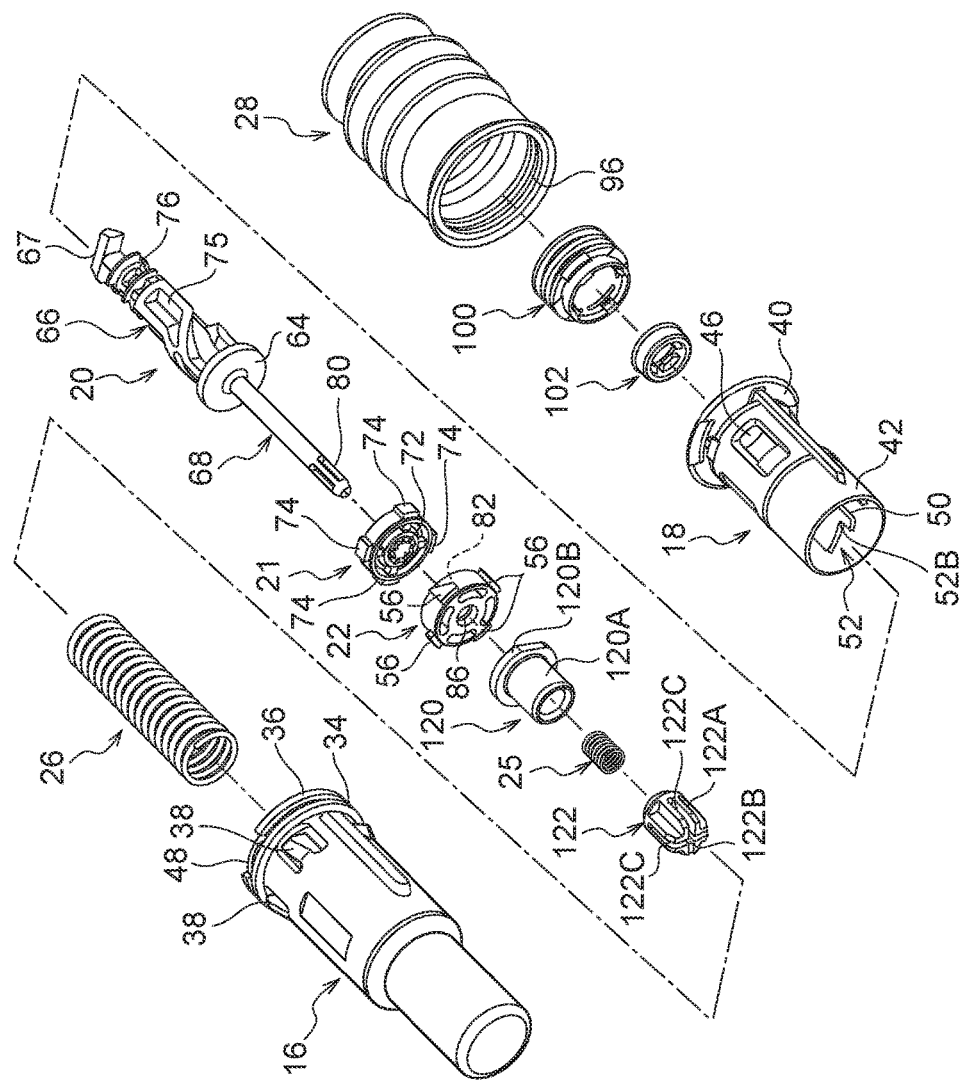
FIG. 11 is an exploded perspective view illustrating a push-up device according to the second exemplary embodiment of the present invention.

Next, explanation follows regarding a second exemplary embodiment of a push-up device of the present invention, with reference to FIG. 9 to FIG. 11.

Like members to those of the first exemplary embodiment are appended with the same reference numerals, and further explanation thereof is omitted.

As illustrated in FIG. 9 to FIG. 11, in the present exemplary embodiment, a sleeve 120 is provided instead of the first sleeve 23 of the first exemplary embodiment, and a grommet 122 is provided instead of the second sleeve 24 of the first exemplary embodiment.

The sleeve 120 includes a sleeve main body 120A, and a flange 120B, and the grommet 122 includes a grommet main body 122A, a reduced diameter portion 122B, and slits 122C.

A lower-side rod section 68 of the rod 20 is inserted through the sleeve 120, and the sleeve 120 is positioned between a rotation cam 22 and a second spring 26. The lower-side rod section 68 of the rod 20 is inserted through the grommet 122, and the grommet 122 is positioned at the lower side of the sleeve 120.

As illustrated in FIG. 9, the sleeve main body 120A of the sleeve 120 and the grommet main body 122A of the grommet 122 are formed in tube shapes, and have the lower-side rod section 68 inserted therethrough. The flange 120B of the sleeve 120 is positioned at an upper end portion of the sleeve main body 120A, abutting the rotation cam 22, and extending in radial directions both outwards and inwards.

The reduced diameter portion 122B of the grommet 122 is positioned at a lower end portion of the grommet main body 122A, on the opposite side to the upper end portion, and juts out in radial directions inwards. The reduced diameter portion 122B is formed so as to fit into the constricted portion 80 formed at the lower end portion of the lower-side rod section 68 of the rod 20. Note that the height of the constricted portion 80 of the rod 20 is set so as to be higher than the thickness in the up-down direction of the reduced diameter portion 122B of the grommet 122. This thereby achieves a configuration in which there is a clearance in the height direction of the constricted portion 80 in a state in which the reduced diameter portion 122B is fitted into the constricted portion 80. As a result, the reduced diameter portion 122B of the grommet 122 is able to ascend or descend by the clearance amount to the constricted portion 80 of the rod 20. On the other hand, the rod 20 is able to ascend or descend with respect to the grommet 122 by the clearance amount.

Two pairs of the slits 122C are formed in the diameter direction of the grommet main body 122A, such that the slits 122C divide the lower end portion of the grommet main body 122A into plural divisions. The slits 122C are formed from the end face at the lower side of the grommet main body 122A, upward to partway along the grommet main body 122A.

The second spring 26 is positioned between the case 16 and the grommet 122, is compressed between the outer peripheral portion of the flange 120B of the grommet 122 and the bottom of the case 16, and biases the rod 20, through the rotation cam 22 and the slide cam 21, in a jutting out direction to push the rod 20 out from inside the case 16. The first spring 25 is positioned between the grommet 122 and the sleeve 120, is compressed between the grommet main body 122A of the grommet 122 and the inner peripheral portion of the flange 120B, and biases the sleeve 120 and the grommet 122 in the direction away from each other.

Operation and Advantageous Effects

Explanation follows regarding the operation and advantageous effects of the push-up device 10 of the present exemplary embodiment.

Note that explanation will be omitted for like operation and advantageous effects to those of the first exemplary embodiment.

In the present exemplary embodiment, the second spring 26 is elastically compressed between the inside of the case 16 and the sleeve 120, biasing the rod 20 through the sleeve 120 toward the jutting out direction. The first spring 25 is elastically compressed between the sleeve 120 and the grommet 122, biasing the sleeve 120 and the grommet 122 in the direction away from each other. Thus, in the locked state illustrated in FIG. 10, due to the first spring 25 being locked in a state in which the rotation cam 22 is pressed against the slide cam 21, play of the rod 20 in the axial direction is reduced.

Third Exemplary Embodiment

Figure 12:
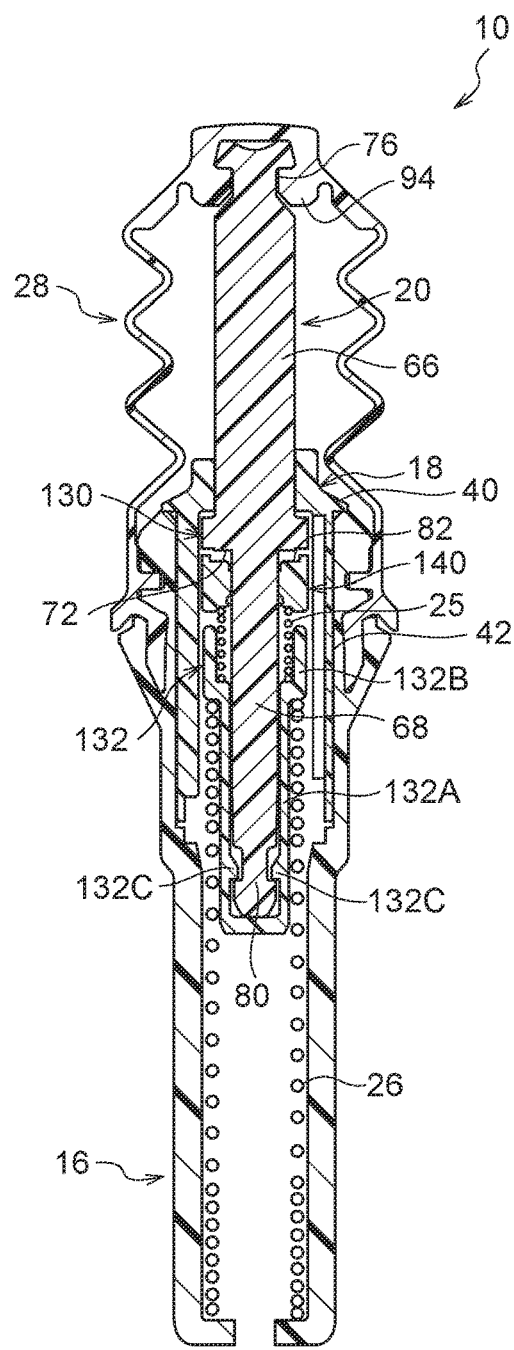
FIG. 12 is a cross-section taken from the side and illustrating a lock-released state of a push-up device according to a third exemplary embodiment of the present invention.
Figure 13:
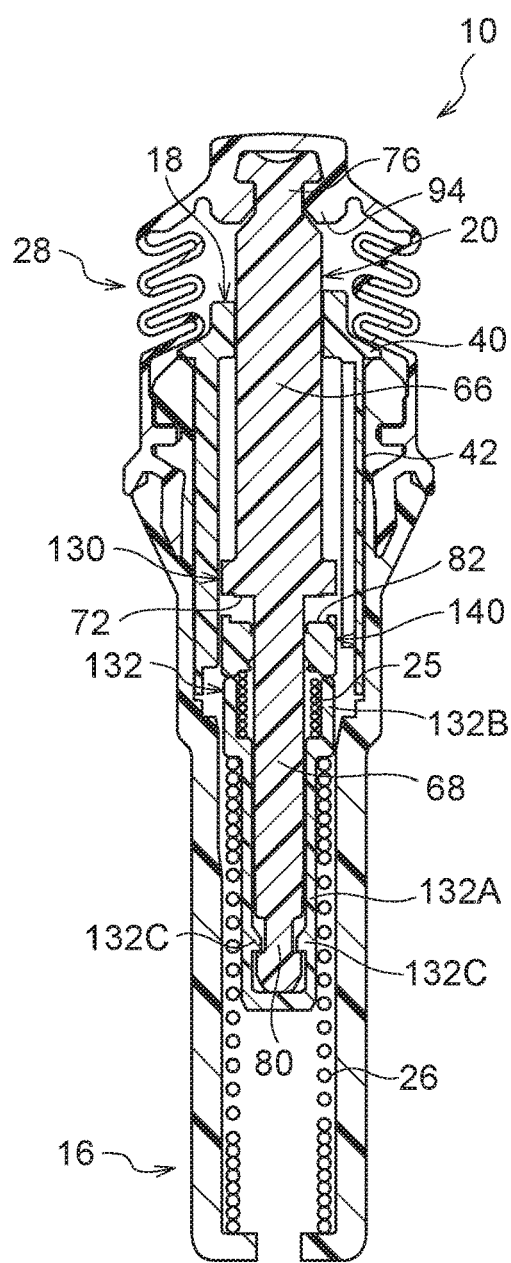
FIG. 13 is a cross-section taken from the side and illustrating a locked state of a push-up device according to the third exemplary embodiment of the present invention.

Explanation follows regarding a third exemplary embodiment of a push-up device of the present invention, with reference to FIG. 12 to FIG. 14.

Note that like members to those of the first exemplary embodiment are appended with the same reference numerals, and further explanation thereof is omitted.

As illustrated in FIG. 12 and FIG. 14, in the present exemplary embodiment, the jutting out portion 64 of the rod 20 and the slide cam 21 of the first exemplary embodiment have been integrated together to configure a cam portion 130 as a slide cam of the rod 20. The rotation cam 22 of the first exemplary embodiment is configured by a rotation cam 140. Thus in the present exemplary embodiment, the rod 20 is retained by the slide grooves 50 so as to be capable of sliding, but not capable of rotating. Moreover, the upper end portion of the boot 28 is closed off in a bag shape, with a ring shaped projection 94 formed on the inner peripheral face of an upper end portion of the boot 28 so as to jut out in a ring shape in radial directions toward the inside, such that the ring shaped projection 94 fits into an annular groove 76 formed at the upper end of the rod 20.

A sleeve 132 is provided in the present exemplary embodiment instead of the first sleeve 23 and the second sleeve 24 of the first exemplary embodiment. The sleeve 132 includes a sleeve main body 132A, a flange portion 132B, a reduced diameter portion 132C, and slits 132D.

The sleeve 132 has the lower-side rod section 68 of the rod 20 inserted therethrough, and is positioned at the lower side of the rotation cam 140. The sleeve main body 132A of the sleeve 132 is formed in a tube shape, and has the lower-side rod section 68 inserted therethrough. The flange portion 132B of the sleeve 132 is positioned at an upper end portion of the sleeve main body 132A, abutting the rotation cam 140, extends in radial directions outwards, and is formed with a tube shaped wall portion facing upward at an outer peripheral portion thereof.

The reduced diameter portion 132C of the sleeve 132 is positioned at the lower end portion of the sleeve main body 132A, on the opposite side to the upper end portion, and juts out in radial directions toward the inside. The reduced diameter portion 132C is configured to fit into the constricted portion 80 formed to the lower end portion of the lower-side rod section 68 of the rod 20. The height of the constricted portion 80 of the rod 20 is set so as to be higher than the thickness in the up-down direction of the reduced diameter portion 132C of the sleeve 132. As a result thereof, clearance arises in the height direction of the constricted portion 80 in a state in which the reduced diameter portion 132C is fitted into the constricted portion 80. The reduced diameter portion 132C of the sleeve 132 is capable of ascending or descending by the amount of clearance to the constricted portion 80 of the rod 20. On the other hand, the rod 20 is capable of ascending or descending with respect to the sleeve 132 by the clearance amount. The slits 132D divide an up-down direction intermediate portion of the sleeve main body 132A in to plural divisions.

The second spring 26 is positioned between the case 16 and the sleeve 132, so as to be compressed between an outer peripheral portion of the flange portion 132B and the bottom of the case 16, and biases the rod 20, through the sleeve 132, in the jutting out direction to push the rod 20 out from inside the case 16. The first spring 25 is positioned between the sleeve 132 and the rotation cam 140, so as to be compressed between the flange portion 132B of the sleeve 132 and the rotation cam 140, and to bias the rotation cam 140 and the sleeve 132 in the direction away from each other.

Operation and Advantageous Effects

Next, explanation follows regarding the operation and advantageous effects of the push-up device 10 of the present exemplary embodiment.

Note that explanation will be omitted for like operation and advantageous effects to those of the first exemplary embodiment.

In the present exemplary embodiment, as illustrated in FIG. 13, the second spring 26 having the lower-side rod section 68 of the rod 20 inserted therethrough is elastically compressed between the inside of the case 16 and the sleeve 132, biasing the rod 20, through the sleeve 132, toward the jutting out direction. The first spring 25 having the lower-side rod section 68 inserted therethrough is elastically compressed between the sleeve 132 and the rotation cam 140, biasing the rotation cam 140 and the sleeve 132 in the direction away from each other. Thus, in the locked state illustrated in FIG. 13, the sleeve 132 biased by the second spring 26 abuts the rotation cam 140, and the rotation cam 140 is locked in a state pressed against the cam portion 130, and so play of the rod 20 in the axial direction is reduced.

Moreover, in the present exemplary embodiment, whereas there is a gap between the rotation cam 140 and the sleeve 132 in the unlocked state of the rod 20 illustrated in FIG. 12, there is no gap between the rotation cam 140 and the sleeve 132 in the locked state of the rod 20 illustrated in FIG. 13. Moreover, in the locked state, the second spring 26 locks the rotation cam 140 in a state is pressed against the cam portion 130. However, when operated, the rod 20 is pressed in the opposite direction to the jutting out direction, and so a gap arises between the rotation cam 140 and the sleeve 132 as illustrated in FIG. 12, and the biasing force of the second spring 26 ceases to act on the rotation cam 140 and the cam portion 130. Therefore, by suppressing the biasing force of the first spring 25 to the minimum light load necessary to operate the 140 and the cam portion 130, the operational noise of rotation cam 140 and the cam portion 130 can be reduced.

Other Exemplary Embodiments

Although the present invention has been explained in detail for particular exemplary embodiments as described above, the present invention is not limited to the above exemplary embodiments, and it will be clear to a person of ordinary skill in the art that various other exemplary embodiments are possible within the range of the present invention. For example, the rod biasing member, lock mechanism, and rotation cam biasing member are not limited to the configurations of the above exemplary embodiments.

The push-up device 10 of the present invention in each of the above exemplary embodiments is attached to the vehicle body inner panel 14, serving as a second member, facing the fuel lid 12, serving as a first member. However, the push-up device of the present invention may be attached to another second member other than a vehicle body inner panel, facing another first member other than a fuel lid.

The entire contents of the disclosure of Japanese Patent Application No. 2014-003482 filed Jan. 10, 2014, is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A push-up device, comprising:
   a tube shaped case that is fixed at a side of a second member that faces a first member;
   a rod that is retained inside the case so as to be capable of sliding, and that juts out from inside the case to adopt an advanced position pushing out the first member;
   a rod biasing member that is positioned between the case and the rod, and that is compressed under elastic deformation inside the case, so as to bias the rod in a jutting out direction pushing the rod out from inside the case;
   a lock mechanism including:
      a slide cam that moves together with the rod in the jutting out direction, and
      a rotation cam that is provided at a rear side of the slide cam in the jutting out direction and that is capable of relative rotation with respect to the slide cam about an axis of the rod,
      with the lock mechanism positioned between the case and the rod, and locking the rod in a retracted position in the case due to the rotation cam engaging with the slide cam and rotating due to the rod being pressed in against a biasing force of the rod biasing member; and
   a rotation cam biasing member that is provided inside the case and separately from the rod biasing member, and that biases the rotation cam toward the jutting out direction.

2. The push-up device of claim 1, wherein the lock mechanism further includes:
   a jutting out portion that is positioned partway along an axial direction of the rod and juts out in a radial direction toward an outer side;
   a lower-side rod section positioned at the rear side in the jutting out direction with the jutting out portion as a boundary, so as to be capable of sliding in the axial direction, the lower-side rod section supporting the slide cam, and supporting the rotation cam at the rear side of the slide cam in the jutting out direction such that the rotation cam is capable of rotating and capable of sliding in the axial direction, and the rotation cam meshing with the slide cam, and disengaging and being imparted with a rotation force in one direction by sliding of the rod;
   a slide groove that is positioned at one of an outer peripheral face of the slide cam or an inner peripheral face of the case, and that extends along a slide direction of the rod,
   a slide projection that is positioned at another of the outer peripheral face of the slide cam or the inner peripheral face of the case, and that prevents rotation of the slide cam with respect to the case due to relative sliding of the slide projection inside the slide groove due to sliding of the slide cam;
an engagement projection that juts out from one of an outer peripheral face of the rotation cam or the inner peripheral face of the case;
a lock groove that is positioned at another of the outer peripheral face of the rotation cam or the inner peripheral face of the case, that includes a lock portion into which the engagement projection fits, the engagement projection that has been fitted into the lock portion being disengageable from the lock portion by the rotation cam rotating due to the rotation cam disengaging from the slide cam;
a first sleeve that is supported at a rear side of the rotation cam in the jutting out direction by the lower-side rod section so as to be capable of rotating and capable of sliding in the axial direction, and that is capable of abutting the rotation cam; and
a second sleeve that is inserted at the lower-side rod section at a rear side of the first sleeve in the jutting out direction, and that limits movement of the rod in the slide direction, and wherein:
the rotation cam biasing member comprises a first spring that is inserted at the lower-side rod section, that is elastically compressed between the first spring and the second sleeve, and that biases the first sleeve toward the jutting out direction, and
the rod biasing member comprises a second spring that is inserted at the lower-side rod section, that is elastically compressed between the case inside and the second sleeve, and that biases the second sleeve toward the jutting out direction.

3. The push-up device of claim 1, wherein the lock mechanism further includes:
a jutting out portion that is positioned partway along an axial direction of the rod and juts out in a radial direction toward an outer side;
a lower-side rod section positioned at the rear side in the jutting out direction with the jutting out portion as a boundary, so as to be capable of sliding in the axial direction, the lower-side rod section supporting the slide cam, and supporting the rotation cam at the rear side of the slide cam in the jutting out direction such that the rotation cam is capable of rotating and capable of sliding in the axial direction, and the rotation cam meshing with the slide cam, and disengaging and being imparted with a rotation force in one direction by sliding of the rod;
a slide groove that is positioned at one of an outer peripheral face of the slide cam or an inner peripheral face of the case, and that extends along a slide direction of the rod,
a slide projection that is positioned at another of the outer peripheral face of the slide cam or the inner peripheral face of the case, and that prevents rotation of the slide cam with respect to the case due to relative sliding of the slide projection inside the slide groove due to sliding of the slide cam;
an engagement projection that juts out from one of an outer peripheral face of the rotation cam or the inner peripheral face of the case;
a lock groove that is positioned at another of the outer peripheral face of the rotation cam or the inner peripheral face of the case, that includes a lock portion into which the engagement projection fits, the engagement projection that has been fitted into the lock portion being disengageable from the lock portion by the rotation cam rotating due to the rotation cam disengaging from the slide cam;
a sleeve that is supported at a rear side of the rotation cam in the jutting out direction by the lower-side rod section so as to be capable of rotating and capable of sliding in the axial direction, and that is capable of abutting the rotation cam; and
a grommet that is disposed at a rear side of the sleeve in the jutting out direction, that is inserted at the lower-side rod section, and that limits movement of the rod in the slide direction, and wherein:
the rotation cam biasing member comprises a first spring that is inserted at the lower-side rod section, that is elastically compressed between the sleeve and the grommet, and that biases the sleeve toward the jutting out direction, and
the rod biasing member comprises a second spring that is inserted at the lower-side rod section, that is elastically compressed between the case inside and the sleeve, and that biases the sleeve toward the jutting out direction.

4. The push-up device of claim 1, wherein the lock mechanism further includes:
a lower-side rod section positioned at the rear side of the slide cam in the jutting out direction, the lower-side rod section supporting the rotation cam such that the rotation cam is capable of rotating and capable of sliding in the axial direction, and the rotation cam meshing with the slide cam, and that disengaging and being imparted with a rotation force in one direction by sliding of the rod;
a slide groove that is positioned at one of an outer peripheral face of the slide cam or an inner peripheral face of the case, and that extends along a slide direction of the rod,
a slide projection that is positioned at another of the outer peripheral face of the slide cam or the inner peripheral face of the case, and that prevents rotation of the rod with respect to the case due to relative sliding of the slide projection inside the slide groove due to sliding of the rod;
an engagement projection that juts out from one of an outer peripheral face of the rotation cam or the inner peripheral face of the case;
a lock groove that is positioned at another out of the outer peripheral face of the rotation cam or the inner peripheral face of the case, that includes a lock portion into which the engagement projection fits, the engagement projection that has been fitted into the lock portion being disengageable from the lock portion by the rotation cam rotating due to the rotation cam disengaging from the slide cam; and
a sleeve that limits movement of the rod in the slide direction of the rod, the sleeve being inserted at the lower-side rod section, and wherein:
the slide cam is formed partway along an axial direction of the rod and juts out in a radial direction toward an outer side,
the rotation cam biasing member comprises a first spring that is inserted at the lower-side rod section, that is elastically compressed between the rotation cam and the sleeve, and that biases the rotation cam toward the jutting out direction, and
the rod biasing member comprises a second spring that is inserted at the lower-side rod section, that is elastically compressed between the case inside and the sleeve, and that biases the sleeve toward the jutting out direction.

5. The push-up device of claim 1, wherein the second member is a vehicle body, and the first member is a fuel lid attached to the vehicle body so as to be capable of rotating in opening and closing directions.

6. The push-up device of claim 2, wherein the second member is a vehicle body, and the first member is a fuel lid attached to the vehicle body so as to be capable of rotating in opening and closing directions.

7. The push-up device of claim 3, wherein the second member is a vehicle body, and the first member is a fuel lid attached to the vehicle body so as to be capable of rotating in opening and closing directions.

8. The push-up device of claim 4, wherein the second member is a vehicle body, and the first member is a fuel lid attached to the vehicle body so as to be capable of rotating in opening and closing directions.

* * * * *